(12) United States Patent
Kimura et al.

(10) Patent No.: US 8,179,795 B2
(45) Date of Patent: May 15, 2012

(54) COMMUNICATION TERMINAL APPARATUS, DISTRIBUTION APPARATUS, ERROR NOTIFICATION METHOD, AND ERROR NOTIFICATION PROGRAM

(75) Inventors: Hiroaki Kimura, Shinjuku (JP); Shingo Izawa, Shinjuku (JP)

(73) Assignee: KDDI Corporation, Tokyo (JP)

( * ) Notice: Subject to any disclaimer, the term of this patent is extended or adjusted under 35 U.S.C. 154(b) by 0 days.

(21) Appl. No.: 12/593,470

(22) PCT Filed: Mar. 26, 2008

(86) PCT No.: PCT/JP2008/055721
§ 371 (c)(1),
(2), (4) Date: Sep. 28, 2009

(87) PCT Pub. No.: WO2008/120634
PCT Pub. Date: Oct. 9, 2008

(65) Prior Publication Data
US 2010/0097929 A1 Apr. 22, 2010

(30) Foreign Application Priority Data
Mar. 29, 2007 (JP) .................................. 2007-089745

(51) Int. Cl.
*H04J 1/16* (2006.01)
(52) U.S. Cl. ........................................................ 370/230
(58) Field of Classification Search ................... 370/230
See application file for complete search history.

(56) References Cited

U.S. PATENT DOCUMENTS

| | | | | |
|---|---|---|---|---|
| 6,404,739 | B1 * | 6/2002 | Gonno | 370/236 |
| 6,542,491 | B1 * | 4/2003 | Tari et al. | 370/338 |
| 6,590,885 | B1 * | 7/2003 | Jorgensen | 370/338 |
| 2003/0185208 | A1 * | 10/2003 | Lee et al. | 370/389 |
| 2004/0210666 | A1 * | 10/2004 | Selitrennikoff et al. | 709/230 |
| 2006/0114931 | A1 * | 6/2006 | Miyata | 370/466 |

FOREIGN PATENT DOCUMENTS

| | | |
|---|---|---|
| JP | 06-164807 A | 6/1994 |
| JP | 2000-253022 A | 9/2000 |
| JP | 2003-258833 A | 9/2003 |
| JP | 2005-20116 A | 1/2005 |
| JP | 2006-311617 A | 11/2006 |

OTHER PUBLICATIONS

I. Miki, "Serial Article: Invitation to IPv6 Networks (No. 3) 'Header Format of IPv6'" [online], Oct. 5, 2001, <URL:http//www.atmarkit.co.jp/club/print/print.php>.
International Search Report of PCT/JP2008/055721, date of mailing Apr. 22, 2008.

(Continued)

*Primary Examiner* — Ayaz Sheikh
*Assistant Examiner* — Hai-Chang Hsiung
(74) *Attorney, Agent, or Firm* — Westerman, Hattori, Daniels & Adrian, LLP (57) ABSTRACT

A communication terminal apparatus (130) includes a receiving unit (132) that receives distribution data distributed through a unidirectional communication network (210), an OS/application unit (131) that accepts transmission data to a tunneling apparatus (120), and a communication processing unit (133) that transmits the transmission data to a bidirectional communication network (220). When the communication processing unit (133) detects an error message of an encapsulated packet from the network (220) using a detecting unit (134), a setting unit (135) sets new transmission data that includes the error message. An error processing unit (136) subjects the transmission data to a process of resolving the error and thereafter, the transmission data is again transmitted to the network (220) to use the transmission data as distribution data from the tunneling apparatus (120).

8 Claims, 8 Drawing Sheets

OTHER PUBLICATIONS

Notification of Transmittal of Translation of the International Preliminary Report on Patentability (Form PCT/IB/338) of International Application No. PCT/JP2008/055721 mailed Oct. 29, 2009 with Forms PCT/IB/373 and PCT/ISA/237.
Notification of Concerning Transmittal of International Preliminary Report on Patentability (form PCT/IB/326) of International Application No. PCT/JP2008/055721 mailed Oct. 8, 2009 with forms PCT/IB/373, PCT/ISA/237 (partial English translation).
Japanese Office Action dated Mar. 15, 2011, issued in corresponding Japanese Patent Application No. 2007-089745.
Chinese Office Action dated Dec. 7, 2011, issued in corresponding Chinese Patent Application No. 200880010034.1.

* cited by examiner

FIG.2-2

| RECEIVING UNIT 132 (INTERFACE A) | MAC ADDRESS: MAC-A<br>IP ADDRESS: IP-A |
|---|---|
| COMMUNICATION PROCESSING UNIT 133 (INTERFACE B) | MAC ADDRESS: MAC-B<br>IP ADDRESS: IP-B |
| RELAY APPARATUS R3 (INTERFACE M) | MAC ADDRESS: MAC-M<br>IP ADDRESS: IP-M |
| RECEIVING UNIT 121 (INTERFACE Y) | MAC ADDRESS: MAC-Y<br>IP ADDRESS: IP-Y |
| Z ROUTER (INTERFACE Z) | MAC ADDRESS: MAC-Z<br>IP ADDRESS: IP-Z |
| DISTRIBUTING UNIT 122 (INTERFACE X) | MAC ADDRESS: MAC-X<br>IP ADDRESS: IP-X |

MAXIMUM SIZE ACCORDING TO MTU,
MTU=1,500 BYTES

FIG.7

SIZE EXCEEDING MTU,
MTU=MTU($\alpha$)

COMMUNICATION TERMINAL APPARATUS, DISTRIBUTION APPARATUS, ERROR NOTIFICATION METHOD, AND ERROR NOTIFICATION PROGRAM

TECHNICAL FIELD

The present invention relates to a communication terminal apparatus that receives using a unidirectional communication network and that transmits using a bidirectional communication network, a distribution apparatus that distributes distribution data using a unidirectional communication network and that receives transmission data from each terminal being a distribution destination of the distribution data using a bidirectional communication network, and an error notification method and an error notification program of the above apparatuses.

BACKGROUND ART

Conventionally, to transmit and receive data using a network such as the Internet, connection to a communication counterpart terminal apparatus is established through a LAN (Local Area Network) or a WAN (Wide Area Network) that is configured according to any one of various standards such as Ethernet (a registered trade mark), an FDDI (Fiber-Distributed Data Interface), and an ATM (Asynchronous Transfer Mode).

A given relay apparatus such as a router is equipped between networks. The relay apparatus has a function of monitoring whether transmission data transmitted to a network is transmittable. Therefore, when the relay apparatus finds an error in the transmission data, the relay apparatus transmits an error message corresponding to the content of the error to a communication terminal apparatus that is the transmission source of the transmission data.

An error message may be, for example, a packet too big message, a destination unreachable message, a time exceeded message, and a parameter problem message. The details of processing for using a network based, in particular, on the IPv6 (Internet Protocol Version 6) will be described taking an example where a packet-capacity exceeded message is transmitted from a relay apparatus.
(MTU of Network)

As described, to transmit and receive data between given terminal apparatuses using the Internet, multiple networks must be passed through using relay apparatuses. The networks each have set therein a permissible data size that is transmittable for one packet of transmission. This permissible amount is generally referred to as "MTU (Maximum Transmission Unit)". When multiple networks are passed through to transmit and receive data between communication terminal apparatuses, a terminal apparatus for transmission must adjust the capacity of transmission data such that the transmission data may be transferred through the network having the smallest MTU.

Figure 10:
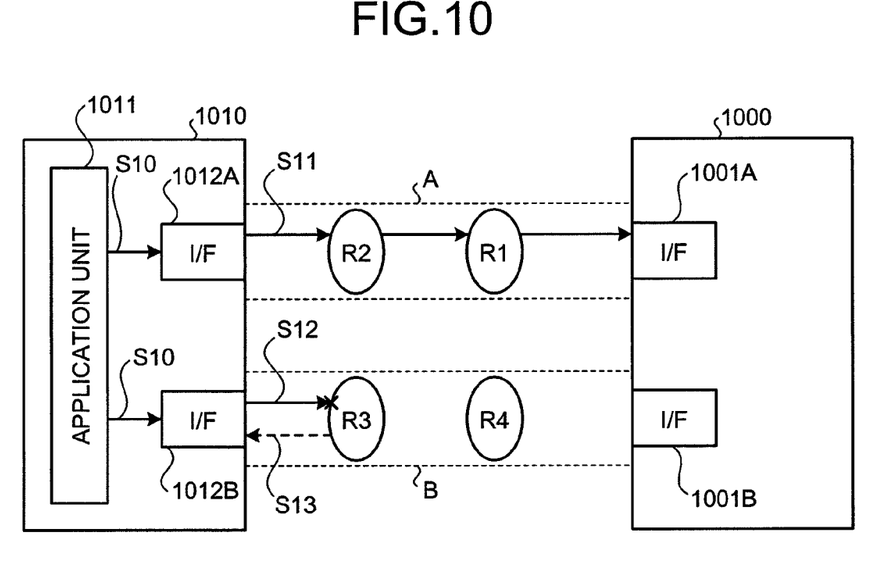
FIG. 10 is a diagram for explaining a monitoring process of transmission data by a relay apparatus.

FIG. 10 is a diagram for explaining a monitoring process of transmission data by a relay apparatus. The relay apparatus not only relays between networks but also monitors the capacity of transmission data such that a terminal apparatus for transmission may transmit transmission data of a capacity corresponding to the MTU of a network.

As depicted in FIG. 10, two networks, a network A and a network B, are configured between two communication terminal apparatuses 1000 and 1010. Relay apparatuses R1 and R2, and R3 and R4 are respectively disposed in the networks A and B. Explanation will be given assuming that the communication terminal apparatus 1010 is a terminal for transmission, the communication terminal apparatus 1000 is a terminal for reception, and the MTU of the networks A and B is 1,500 [bytes].

To transmit transmission data from the communication terminal apparatus 1010, a case is tentatively assumed first where the transmission data is output from an application unit 1011 to communication processing interfaces (I/Fs) 1012A and 1012B (S10). A process of actually outputting packets using application software simultaneously to two interfaces is not common. However, to describe the relation between the transmission data and the MTU, a case where the transmission data is output to the communication processing interfaces (I/Fs) 1012A and 1012B is temporarily assumed and will be described for convenience.

In this example, transmission data of a capacity of 1,500 [bytes] or less, representing packet size, is output to the communication processing interface (I/F) 1012A and transmission data of a packet size of 1,500 [bytes] or larger is output to the communication processing interface (I/F) 1012B.

The transmission data transmitted from the communication processing interface (I/F) 1012A to the network A has a capacity equal to or less than the MTU and therefore, the transmission data is received by the communication processing interface (I/F) 1001A of the communication terminal apparatus 1000 for reception through the relay apparatuses R2 and R1 (S11).

On the other hand, the transmission data transmitted from the communication processing interface (I/F) 1012B to the network B has a capacity exceeding the MTU and the relay apparatus R3 detects that the capacity is larger than the MTU (S12). Hence, the transmission data is not transmitted to the communication processing interface (I/F) 1001B of the communication terminal apparatus 1000 and instead, an error message "Packet Too Big" indicating that the transmission data exceeds the MTU is transmitted to the communication terminal apparatus 1010 (S13).

When the communication processing interface (I/F) 1012B of the communication terminal apparatus 1010 receives the error message "Packet Too Big" from the network B, the interface (I/F) 1012B reduces the packet size of the transmission data. This series of processing is known as "Path MTU Discovery (RFC 1981)" (see, for example, Non-Patent Literature 1).

Figure 11:
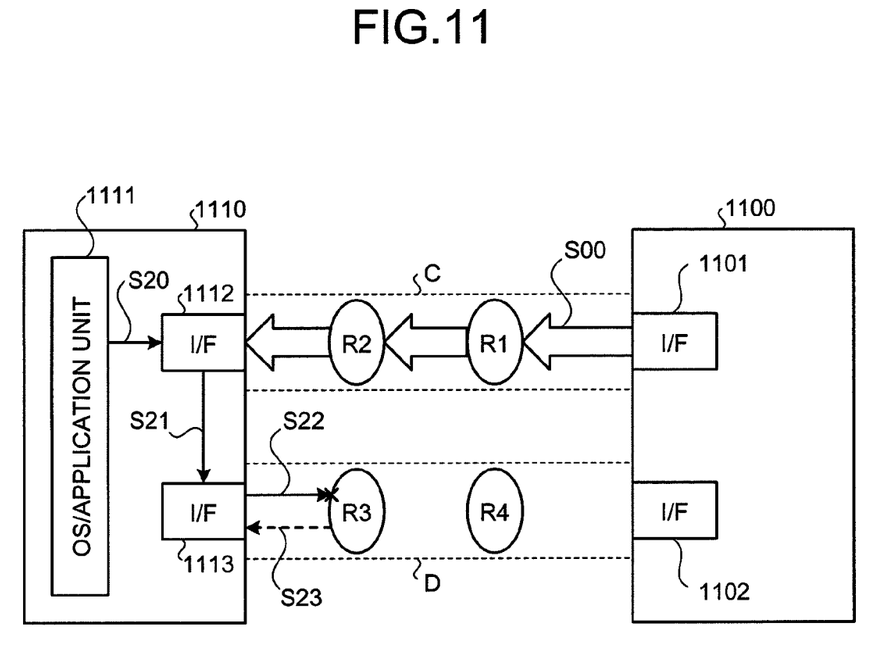
FIG. 11 is a diagram for explaining a monitoring process of a relay apparatus in a network using the UDLR.

Recently, transmission and reception of data using a network that uses UDLR (Uni-Directional Link Routing) has also been realized. FIG. 11 is a diagram for explaining a monitoring process of a relay apparatus in a network using the UDLR.

As depicted in FIG. 11, the network using the UDLR includes a distribution apparatus 1100 that distributes data (distribution data) using a unidirectional communication network, and a communication terminal apparatus 1110 that receives the transmission data. The distribution apparatus 1100 and the communication terminal apparatus 1110 are connected to a unidirectional communication network C dedicated for distribution, and a bidirectional communication network D (a normal network) used for transmitting data from the communication terminal apparatus 1110 to the distribution apparatus 1100.

When the distribution data is distributed from the distribution apparatus 1100 to the communication terminal apparatus 1110, the distribution data is output from a distributing interface (I/F) 1101 to the unidirectional communication network C (S00). From the distribution apparatus 1100, the distribution data may be distributed to a specific communication terminal apparatus or may be distributed to multiple communication terminal apparatuses as a broadcast wave.

The communication terminal apparatus 1110 receives the distribution data using a receiving interface (I/F) 1112. In a network using the UDLR, to transmit a response to the distribution apparatus 1100, transmission data is output from an OS/application unit 1111 to the receiving interface (I/F) 1112 that is connected to the unidirectional communication network C (S20). To transmit as a response to the distribution apparatus 1100, the transmission data that is transmitted as a response to the unidirectional communication network C, the receiving interface (I/F) 1112 realizes a virtual bidirectional communication network by transmitting the transmission data to the bidirectional communication network D. Therefore, the receiving interface (I/F) 1112 applies a given process to the transmission data and outputs the processed transmission data to a communication processing interface (I/F) 1113 (S21).

The communication processing interface (I/F) 1113 transmits the transmission data to the bidirectional communication network D. Here, when the transmission data has a capacity equal to or less than the MTU, the transmission data is transmitted to the distribution apparatus 1100 through the relay apparatuses R3 and R4.

Nonpatent Literature 1: Izumi, Miki, "Serial Article: Invitation to Ipv6 Networks (No. 3) 'Header Format of Ipv6'", [online],Oct. 5, 2001, Research Institute for Internet Strategies, Inc., [Retrieved on Jul. 7, 2006].

DISCLOSURE OF INVENTION

Problem to be Solved by the Invention

However, the above monitoring process using the relay apparatuses does not function normally when bidirectional communication is executed using a network for unidirectional communication.

More specifically, when transmission data having a capacity exceeding the MTU is transmitted (S22) in FIG. 11, the relay apparatus R3 detects that the transmission data exceeds the MTU similarly to the example depicted in FIG. 10. An error message "Packet Too Big" is transmitted from the relay apparatus R3 to the communication terminal apparatus 1110 (S23). Therefore, the transmission data is not transmitted to a receiving interface (I/F) 1102 of the distribution apparatus 1100.

The error message "Packet Too Big" is transmitted to the communication processing interface (I/F) 1113 of the communication terminal apparatus 1110. In this manner, the communication processing interface (I/F) 1113 receives the message "Packet Too Big". However, in the UDLR network, the interface that actually outputs the transmission data from the apparatus is the receiving interface (I/F) 1112. Therefore, the message "Packet Too Big" does not reach the receiving interface (I/F) 1112.

Accordingly, the OS/application unit 1111 recognizes the MTU of the bidirectional communication network D and reduces the packet size of the transmission data that is directly transmitted to the bidirectional communication network D. However, when the transmission data is to be transmitted from the communication terminal apparatus 1110 to the unidirectional communication network C, the OS/application unit 1111 recognizes this transmission data as transmission data to be transmitted from the receiving interface (I/F) 1112 to the unidirectional communication network C and accordingly executes processing. Thus, the OS/application unit 1111 does not reflect at all the message "Packet Too Big" that arrives at the communication processing interface (I/F) 1113 and the OS/application unit 1111 inevitably outputs, consecutively, transmission data having a packet size exceeding the MTU to the receiving interface (I/F) 1112. In this manner, in a UDLR network, "Path MTU Discovery" do not function.

As described, in a UDLR network, error messages by a relay apparatus are not reflected at the communication terminal apparatus 1110. Therefore, in a conventional UDLR network, to prevent the capacity of any transmission data from exceeding the MTU, transmission is executed using the smallest value set as the MTU, as the capacity of the transmission data. Hence, only transmission data having the smallest capacity may be handled regardless of the actual MTU of a network and therefore, a problem has arisen in that the efficiency of the communication is poor.

Even when an error message other than the packet too big message is transmitted, the error message does not reach the interface (in FIG. 11, receiving interface (I/F)) 1112 that has output the transmission data causing the error. Therefore, a problem has arisen in that the error will not be resolved.

To solve the above problems associated with the conventional techniques, an object of the present invention is to provide a communication terminal apparatus, a distribution apparatus, an error notification method, and an error notification program that provide notification of an error to an interface that is the transmission source transmitting transmission data from which the error is detected, enabling the error to be resolved, even using a network that is configured to receive data from a communication counterpart using a unidirectional communication network.

Means for Solving Problem

To solve the problems above and achieve an object, a communication terminal apparatus according to the invention of claim 1 receives using a unidirectional communication network and transmits using a bidirectional communication network. The communication terminal apparatus includes a receiving unit that receives distribution data distributed through the unidirectional communication network; an accepting unit that accepts transmission data to be transmitted to a distribution source of the distribution data received by the receiving unit; and a communication processing unit that transmits the transmission data accepted by the accepting unit to the bidirectional communication network. The communication processing unit includes a detecting unit that detects an error message concerning the transmission data from the bidirectional communication network; a setting unit that sets the transmission data that includes the error message detected by the detecting unit, to be new transmission data; an error processing unit that subjects the new transmission data set by the setting unit to a process of resolving an error corresponding to the error message; and a transmitting unit that transmits the transmission data whose error has been resolved by the error processing unit to the bidirectional communication network to use the transmission data as the distribution data from the distribution source.

According to the invention of claim 1, the error notification does not end with a transmission of an error message to a unit unrelated to the transmission data setting as is conventionally executed, rather the transmission data is processed as new transmission data that includes the error message. The new transmission data is transmitted to the distribution apparatus to be distributed from the distribution apparatus to the transmission source as distribution data.

Further a distribution apparatus according to the invention of claim 5 includes a distributing unit that distributes distribution data using a unidirectional communication network; and a receiving unit that receives transmission data from a terminal that is a distribution destination of the distribution data, using a bidirectional communication network. The distributing unit distributes the transmission data as the distribution data to a terminal that is a transmission source of transmission data that includes an error message received by the receiving unit, when the receiving unit receives transmission data that includes an error message from a terminal.

According to the invention of claim 5, when the transmission data having incorporated therein the error message is received, the transmission data received is distributed as distribution data to a terminal that is the transmission source of the transmission data. Therefore, the error message is directly distributed to the terminal that is the transmission source of the transmission data corresponding to the error message and thereby, enabling notification of the error.

An error notification method according to the invention of claim 7 is that of a communication terminal apparatus that receives by a unidirectional communication network and transmits by a bidirectional communication network. The error notification method includes a receiving step of receiving, distribution data distributed through the unidirectional communication network; an accepting step of accepting transmission data to be transmitted to a distribution source of the distribution data received at the receiving step; and a first transmitting step of transmitting the transmission data accepted at the accepting step to the bidirectional communication network; a setting step of setting, when an error message is detected with respect to the transmission data from the bidirectional communication network, the transmission data including the detected error message to be new transmission data; an error processing step of subjecting the new transmission data set at the setting step to a process of resolving an error corresponding to the error message; and a second transmitting step of transmitting the transmission data whose error has been resolved at the error processing step, to the bidirectional communication network to use the transmission data as the distribution data from the distribution source.

According to the invention of claim 7, the error notification does not end with a transmission of an error message to a unit unrelated to the transmission data setting as is conventionally executed, rather the transmission data is processed as new transmission data that includes the error message. After processing, the new transmission data is transmitted to the distribution apparatus to be distributed from the distribution apparatus to the transmission source as distribution data.

An error notification method according to the invention of claim 8, includes a receiving step of receiving via a bidirectional communication network and by a transmitting unit of a distribution apparatus, transmission data from a terminal that is a distribution destination of the distribution data; and a distributing step of distributing via a unidirectional communication network, by a distribution unit of the distribution apparatus and as distribution data, the transmission data to the terminal that is a transmission source of the transmission data received at the receiving step and inclusive of an error message.

According to the invention of claim 8, when the transmission data having incorporated therein the error message is received, the transmission data received is distributed as distribution data to a terminal that is the transmission source of the transmission data. Therefore, the error message is directly distributed to the terminal that is the transmission source of the transmission data corresponding to the error message and thereby, enabling notification of the error.

An error notification program according to claim 9 causes a computer to execute the error notification method recited in claim 7 or 8.

EFFECT OF THE INVENTION

According to the communication terminal apparatus, the distribution apparatus, the error notification method, and the error notification program of the present invention, an effect is achieved in that error notification may be provided to an interface that is the transmission source transmitting transmission data from which the error is detected and thereby, the error may be resolved even using a network that is configured to receive data from a communication counterpart using a unidirectional communication network.

BRIEF DESCRIPTION OF DRAWINGS

FIG. 2-1 is a diagram for explaining an error message notification process;

FIG. 2-2 is a list of addresses of configurations;

EXPLANATIONS OF LETTERS OR NUMERALS

110 application server
120 tunneling apparatus
121 receiving unit
122 distributing unit
123, 124 I/F (interface) unit
130 communication terminal apparatus
131 OS/application unit
132 receiving unit
133 communication processing unit
134 detecting unit
135 setting unit
136 error processing unit
137 I/F (interface) unit
140*a* unidirectional communication network
140*b* IPv6 relaying network
R1, R2, R3, R4 relay apparatus
Z router

BEST MODE(S) FOR CARRYING OUT THE INVENTION

A preferred embodiment of a communication terminal apparatus, a distribution apparatus, an error notification method, and an error notification program according to the present invention will be described in detail with reference to the accompanying drawings.

(Network Configuration)

Figure 1:
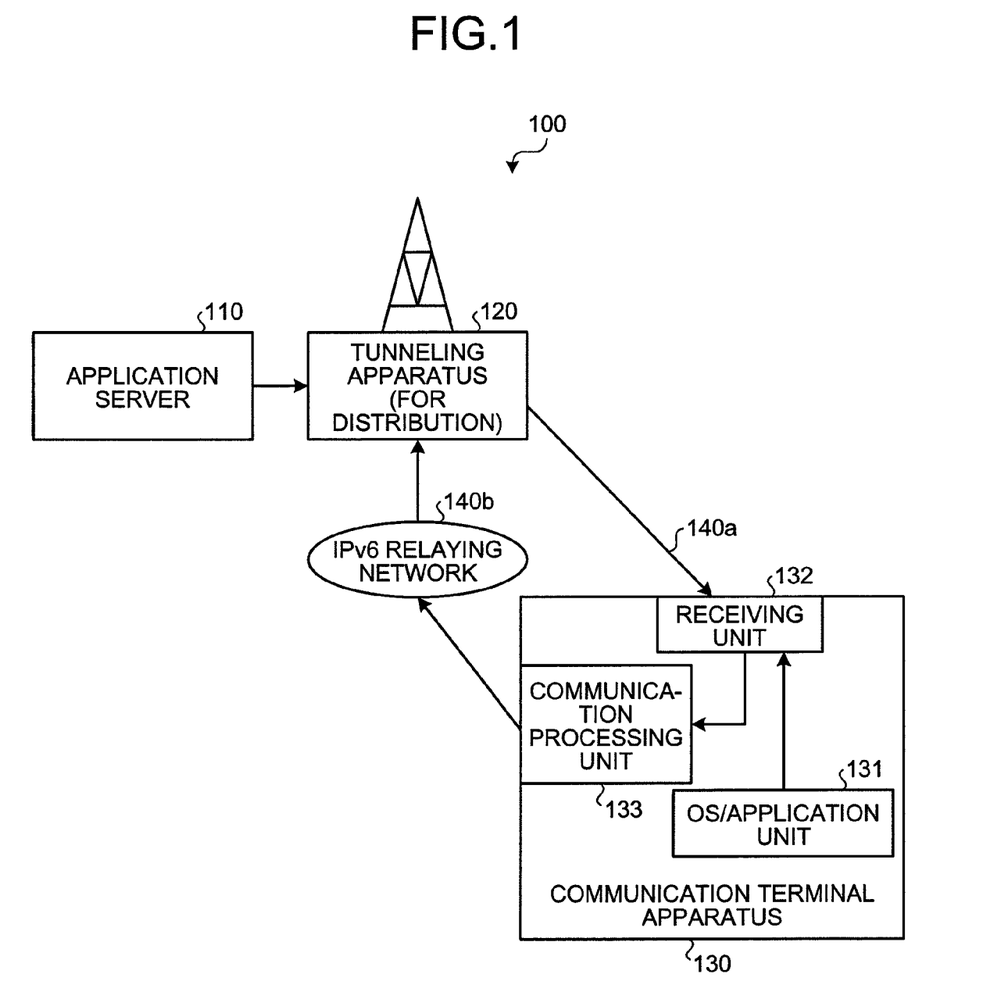
FIG. 1 is a diagram for explaining a network configuration according to the present embodiment.

A network configuration according to the present embodiment will be described. FIG. 1 is a diagram for explaining a network configuration according to the embodiment. As depicted in FIG. 1, a network configuration 100 according to the embodiment includes an application server 110, a tunneling apparatus 120 that functions as a distribution apparatus, and a communication terminal apparatus 130. The network configuration 100 uses the UDLR and therefore, a unidirectional communication network 140a that is used when distribution data is distributed from the tunneling apparatus 120 to the communication terminal apparatus 130, and an IPv6 relaying network 140b that is bidirectional communicable and used when transmission data is transmitted from the communication terminal apparatus 130 to the tunneling apparatus 120 are connected between the tunneling apparatus 120 and the communication terminal apparatus 130.

In the network configuration 100, the application server 110 delivers to the tunneling apparatus 120, application data that is to be distributed to the communication terminal apparatus 130. More specifically, the application server 110 outputs the application data to the tunneling apparatus 120. Output to the tunneling apparatus 120 may be by a physical line or a wireless means.

The "application data" is software data designed according to various purposes and is distributed to the communication terminal apparatus 130. More specifically, the application data is software that causes the communication terminal apparatus 130 to execute a specific function such as given calculation, position searching, game playing, or playing of contents, or is data of contents to be played by the communication terminal apparatus 130. The content of the application data is not particularly limited.

The application data may be distributed to all the communication terminal apparatuses 130 within a distribution area of the tunneling apparatus 120. When the distribution data is distributed, the tunneling apparatus 120 may distribute the distribution data only to a given communication terminal apparatus 130 by setting identification information such as an address or distribution conditions. When the communication terminal apparatus 130 receives the application data, the communication terminal apparatus 130 may transmit arbitrary transmission data to the tunneling apparatus 120 that is the distribution source using the IPv6 relaying network 140b.

The tunneling apparatus 120 distributes to the communication terminal apparatuses 130 the application data delivered from the application server 110 as distribution data. More specifically, the tunneling apparatus 120 distributes (broadcasts) the distribution data to the communication terminal apparatuses 130 using the unidirectional communication network 140a. The tunneling apparatus 120 also accepts the transmission data transmitted as a response from the communication terminal apparatus 130 that receives the distribution data.

The communication terminal apparatus 130 receives the distribution data from the tunneling apparatus 120. The communication terminal apparatus 130 transmits arbitrary transmission data as a response to the tunneling apparatus 120 using the IPv6 relaying network 140b. More specifically, the communication terminal apparatus 130 includes an OS/application unit 131, a receiving unit 132, and a communication processing unit 133.

The OS/application unit 131 functions as an interface for a user of the communication terminal apparatus 130. The OS/application unit 131 accepts transmission data to be transmitted from the user to the tunneling apparatus 120. The receiving unit 132 is connected to the unidirectional communication network 140a and receives distribution data distributed from the tunneling apparatus 120.

Figure 21:
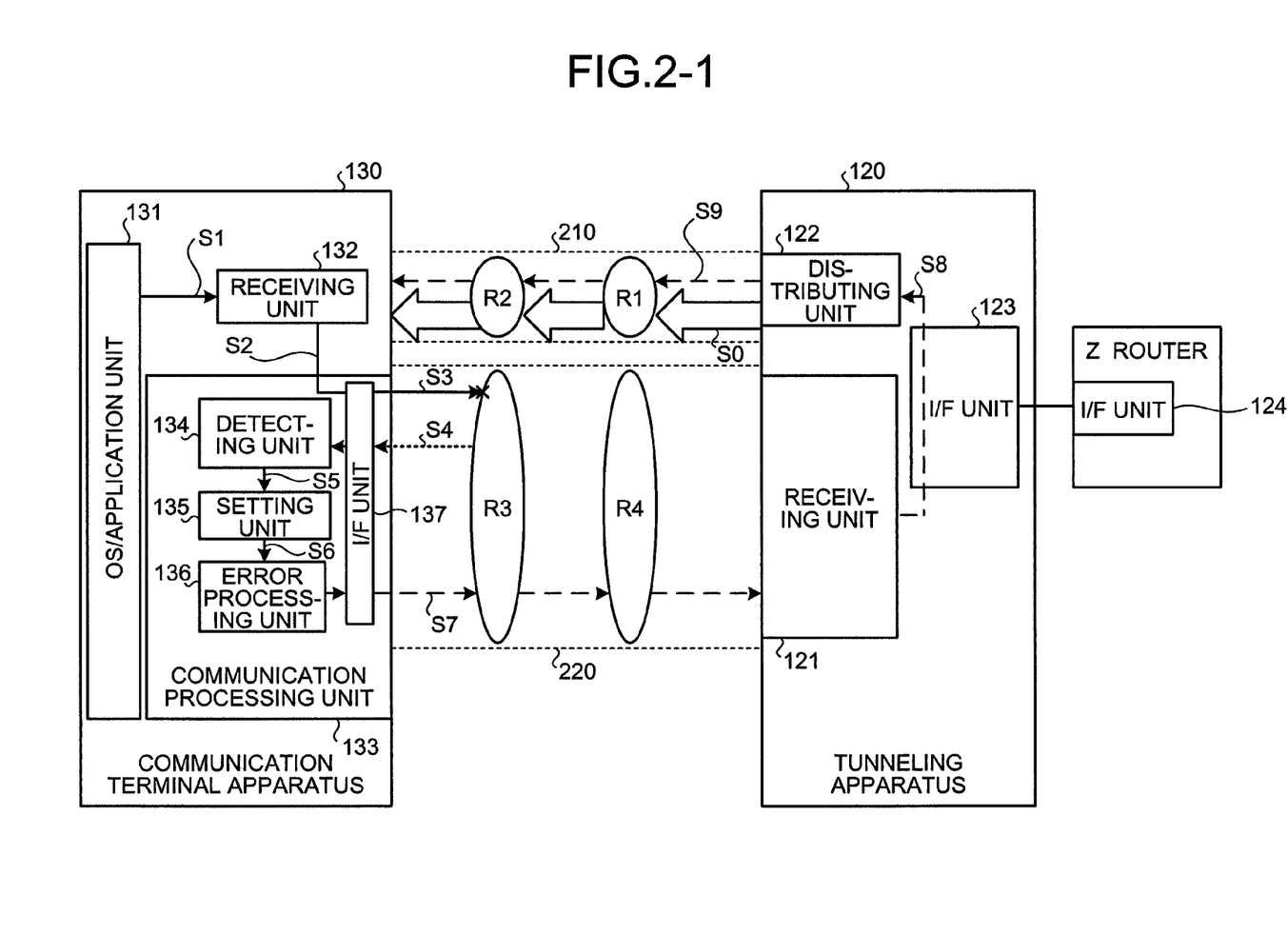

The communication processing unit 133 transmits the transmission data received by the OS/application unit 131 to the IPv6 relaying network 140b that is a bidirectional communication network. When an error message with respect to the transmission data is transmitted as a response from the IPv6 relaying network 140b, the communication processing unit 133 detects the error message. When the communication processing unit 133 detects the error message, the communication processing unit 133 executes a given notifying process to notify the receiving unit 132 of the error message detected. The content of the notifying process of the error message will be described in detail with reference to FIG. 2 hereinafter.

(Error Message Notification Process)

A process by the communication terminal apparatus 130 executed when an error message is transmitted from the IPv6 relaying network 140b of the network configuration 100 depicted in FIG. 1 will be described. In the embodiment, an example will be described where an error message "Packet Too Big" is transmitted to provide notification that transmission data of a capacity exceeding the MTU representing the capacity transmittable in a network, has been transmitted.

FIG. 2-1 is a diagram for explaining the error message notification process. FIG. 2-1 depicts the connection between the tunneling apparatus 120 and the communication terminal apparatus 130. The unidirectional communication network that distributes the application data (distribution data) from the tunneling apparatus 120 is depicted as a network 210 (corresponding to the unidirectional communication network 140a).

Figure 22:
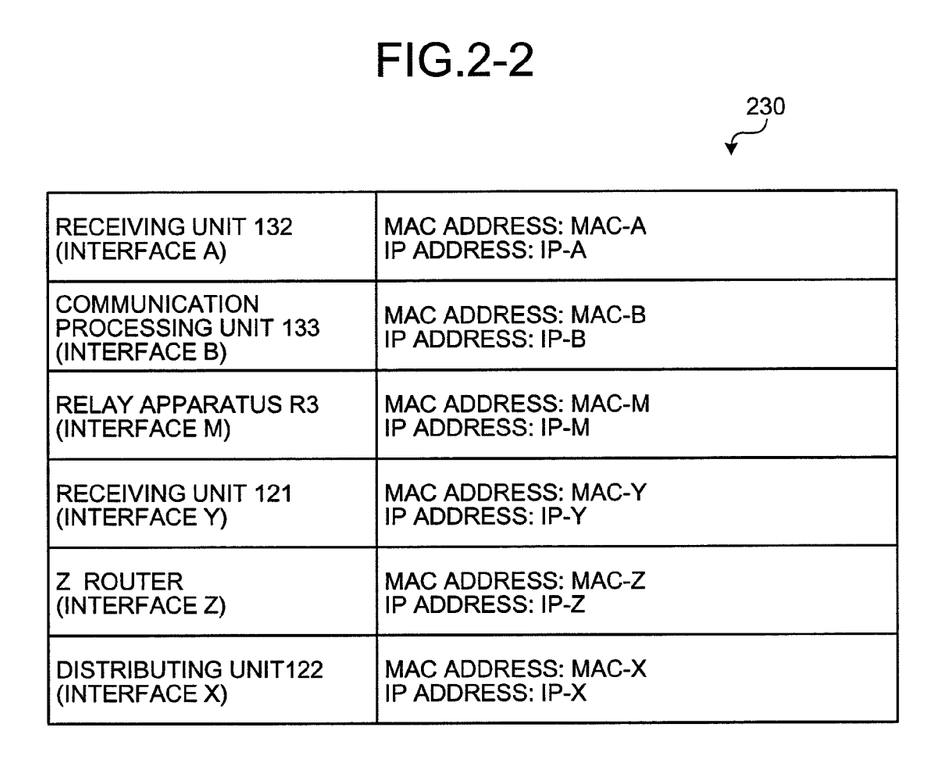

FIG. 2-2 is a list of addresses of configurations. As depicted in FIG. 2-2, in a list 230, an address (for example, an IP address or an MAC address) is set that designates each of the components as the transmission source or a transmission destination of transmission data, for each of the components that functions as an interface when data is transmitted or received. In practice, addresses are also set for each of the relay apparatuses R1, R2, and R4 described hereinafter. However, the embodiment does not include any process to designate the addresses of the relay apparatuses R1, R2, and R4 and therefore, representation of such addresses is omitted.

It is assumed that the transmission data transmitted from the communication terminal apparatus 130 is information having set therein a router Z connected to the tunneling apparatus 120 as its transmission destination. As depicted in FIG. 2-1, the tunneling apparatus 120 and the router Z are connected by I/F (interface) units 123 and 124.

The bidirectional communication network that transmits the transmission data from the communication terminal apparatus 130 to the tunneling apparatus 120 is represented as a network 220 (corresponding to the IPv6 relaying network 140b). As an example, the relay apparatuses R1 and R2 are disposed in the network 210 and the relay apparatuses R3 and R4 are disposed in the network 220.

The receiving unit 132 of the communication terminal apparatus 130 receives distribution data (SO) from the tunneling apparatus 120. The user of the communication terminal apparatus 130 transmits arbitrary transmission data to a distributing unit 122 that is the distribution source as a response to the distribution data. At this time, the data that the OS/application unit 131 has accepted is transmitted as the transmission data. The transmission data is output to the receiving unit 132 that has received the distribution data from the OS/application unit 131 (S1).

The communication terminal apparatus 130 realizes bidirectional communication using the network that uses the UDLR. In practice, the receiving unit 132 and the distributing unit 122 each execute unidirectional communication. However, viewing the processes of the receiving unit 132 and the distributing unit 122 from the OS/application unit 131, the units 132 and 122 seem to function as an interface that executes bidirectional communication. Therefore, the OS/application unit 131 executes the same processes as those executed when the OS/application unit 131 is connected to an interface that executes bidirectional communication.

The receiving unit 132 executes a process to transmit the transmission data input from the OS/application unit 131, to the tunneling apparatus 120. More specifically, to use the network 220 as a virtual network to transmit a response, the receiving unit 132 outputs the transmission data to the communication processing unit 133 (S2).

The configuration of the communication processing unit 133 will be described. As depicted in FIG. 2-1, the communication processing unit 133 includes a detecting unit 134, a setting unit 135, an error processing unit 136, and an I/F (interface) unit 137. When the transmission data is input from the receiving unit 132, the communication processing unit 133 transmits the transmission data from the I/F unit 137 to the network 220 (S3).

When the packet size of the transmission data transmitted from the I/F unit 137 is equal to or smaller than the MTU of the network 220, the transmission data is sent to the tunneling apparatus 120 through the relay apparatuses R3 and R4. However, when the packet size of the transmission data exceeds the MTU of the network 220, the relay apparatus R3 detects that the packet size of the transmission data exceeds the MTU, and an error message "Packet Too Big" is transmitted to the I/F unit 137 of the communication terminal apparatus 130 (S4).

When the error message "Packet Too Big" is transmitted from the relay apparatus R3, the communication processing unit 133 receives the error message through the I/F unit 137. The detecting unit 134, the setting unit 135, and the error processing unit 136 execute an error notification process. The detecting unit 134 first detects the error message (S5). The setting unit 135 then sets data that is formed by including the error message in the transmission data, as new transmission data (S6).

The error processing unit 136 finally executes a process of resolving the error detected by the relay apparatus R3, for the new transmission data set by the setting unit 135. In the embodiment, because the message "Packet Too Big" is detected, a process of adjusting the packet size such that the transmission data has the capacity equal to or smaller than the capacity of the MTU, is executed.

In this example, the process of resolving the error is a process of varying the packet size such that the capacity of the transmission data becomes equal to or smaller than the MTU, because the detecting unit 134 has detected the message "Packet Too Big". The error message "Packet Too Big" includes information that indicates the MTU of the network 220 and therefore, the packet size may be adjusted referring only to this information. The transmission data for which the process of resolving the error is executed by the error processing unit 136 is output again to the I/F unit 137 and is transmitted from the I/F unit 137 to the network 220 (S7).

The transmission data having incorporated therein the error message is transmitted to the tunneling apparatus 120 through the relay apparatuses R3 and R4. The tunneling apparatus 120 receives the transmission data using the receiving unit 121. The receiving unit 121 refers to the address attached to the transmission data received and outputs the transmission data to the distributing unit 122 that is the transmission destination (S8).

When the transmission data having incorporated therein the error message is input into the distributing unit 122 from the receiving unit 121, the distributing unit 122 distributes this transmission data to the communication terminal apparatus 130 as distribution data (S9). When the distribution at S9 is executed, the distributing unit 122 refers to identification information (for example, an address) of the transmission destination of the transmission data and distributes the transmission data such that the distribution data reaches only the communication terminal apparatus 130.

As described, usually, when the distributing unit 122 of the tunneling apparatus 120 distributes the distribution data (for example, the distribution at S0), numerous unspecified communication terminal apparatuses 130 are distribution destinations. However, in the distribution at S9, distribution limited to the communication terminal apparatus 130 that is the transmission destination of the transmission data is executed to notify the apparatus 130 of the error message. Any approach may be used to execute the limited distribution.

When the receiving unit 132 of the communication terminal apparatus 130 receives from the tunneling apparatus 120, the distribution data having incorporated therein the error message, the receiving unit 132 extracts the error message from the distribution data. The receiving unit 132 adjusts the packet size of the transmission data according to the MTU included in the extracted error message "Packet Too Big".

As described, the processes to give notification of the error are executed in the communication terminal apparatus 130 and the tunneling apparatus 120. Therefore, error notification may be executed even using a network configured by the UDLR such that an error message is reflected on the network.

(Adjustment of Transmission Data in Error Message Notification Process)

To execute the error message notification process as depicted in FIG. 2-1, a given adjustment must be executed with respect to the transmission data. Hence, the details of the adjustment of the transmission data in the error message notification process will be described with reference to FIGS. 3 to 9.

Figure 3:
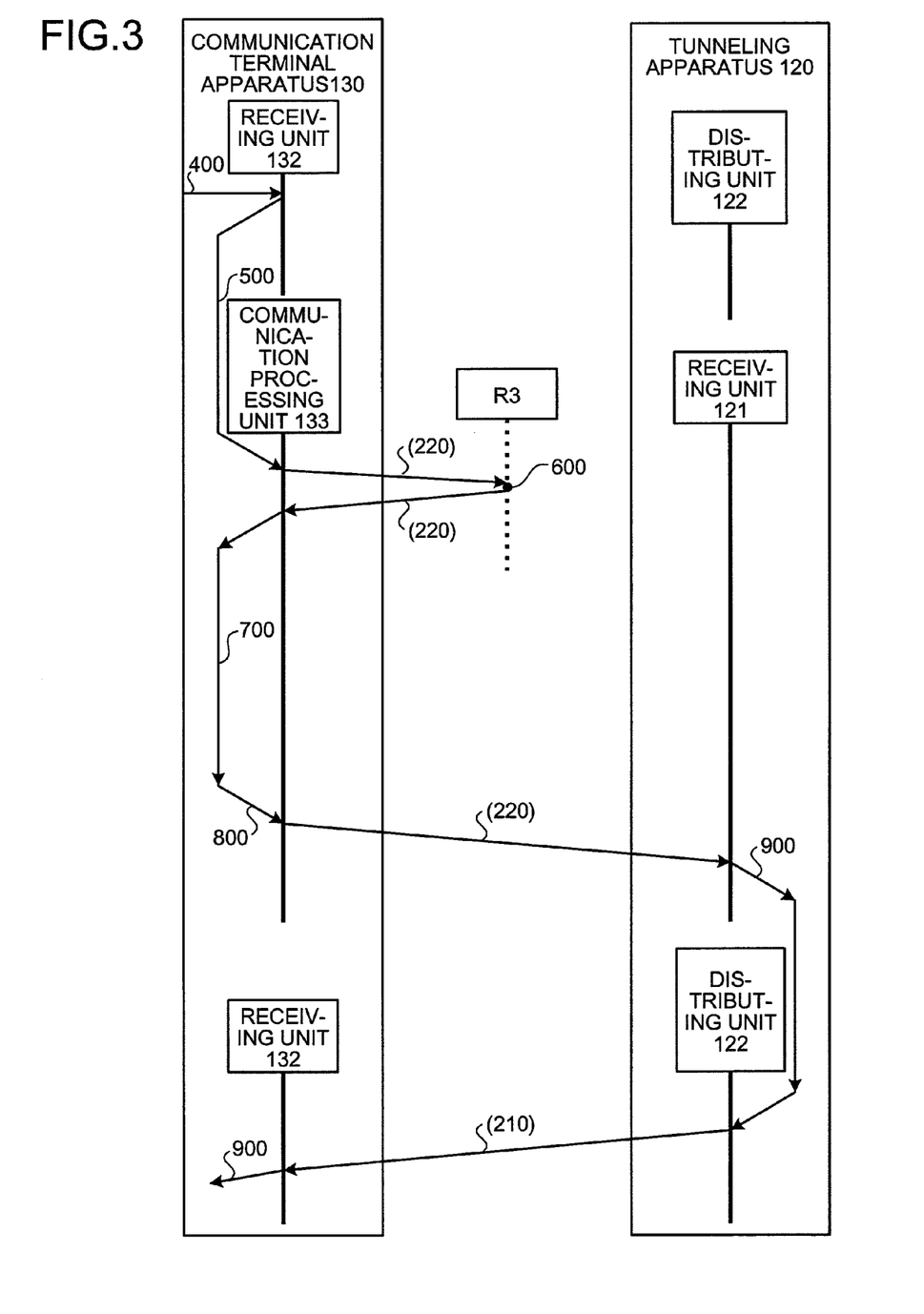
FIG. 3 is a sequence chart of a transmission route of transmission data.

FIG. 3 is a sequence chart of a transmission route of transmission data. As depicted in FIG. 3, transmission data 400 is input into the receiving unit 132 of the communication terminal apparatus 130. The transmission data 400 is the data accepted by the OS/application unit 131 depicted in FIG. 2-1.

Figure 4:
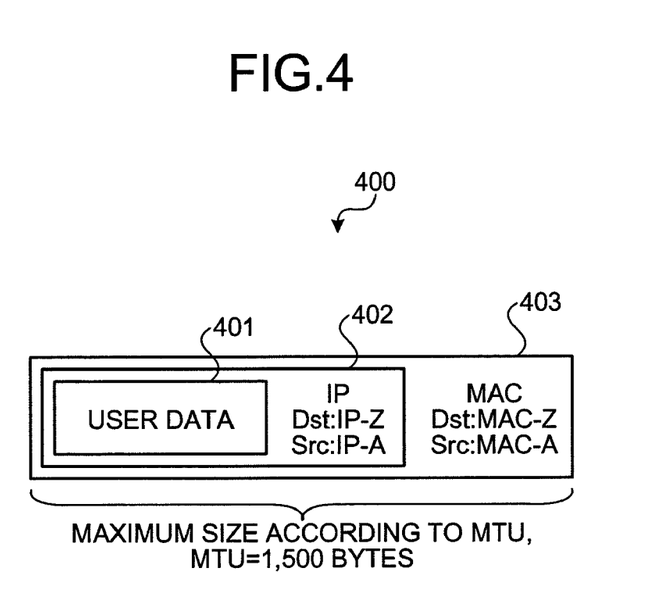
FIG. 4 is a diagram of a configuration a frame of transmission data 400.

FIG. 4 is a diagram of a configuration of the frame of the transmission data 400. It is assumed that the transmission data 400 is information to be transmitted to the router Z. Therefore, as depicted in FIG. 4, the transmission data 400 includes a user data packet 401, an IP packet 402, and an MAC packet 403.

The user data packet 401 is configured by data that is created by a user of the communication terminal apparatus 130. The data that is created by a user may be text data or may be video image data or music data, and the type of data is irrelevant. The data is not limited to data created by the communication terminal apparatus 130 and may be data prepared in advance.

The IP packet 402 stores therein the IP address of the transmission source and the IP address of the transmission destination of the transmission data 400. An IP address is an address set in advance in each component that functions as an interface when data is transmitted or received. More specifically, the IP packet 402 is configured by the IP address (Src: IP-A) of the receiving unit 132 of the communication terminal apparatus 130 that is the transmission source, and the IP address (Dst: IP-Z) of the router Z that is the transmission destination.

The MAC packet 403 stores therein the MAC address of the transmission source and the MAC address of the transmission destination of the transmission data 400. More specifically, the MAC packet 403 is configured by the MAC address (Src: MAC-A) of the receiving unit 132 of the communication terminal apparatus 130 that is the transmission source, and the MAC address (Dst: MAC-Z) of the router Z that is the transmission destination.

To simply the explanation, in the embodiment, it is assumed that the relay apparatuses R1 and R2 are not connected and the receiving unit 132 of the communication terminal apparatus 130 and the I/F unit 124 of the router Z are on the same segment. The address of the router Z itself is used as the MAC address that represents the transmission destination. The receiving unit 132 has set therein in advance the MTU that is the criterion and the packet size is adjusted to be the maximum size according to the MTU.

In the example depicted in FIG. 2-1, an example where the processing is executed assuming that the initial value of the MTU of each of the networks 210 and 220 is 1,500 [bytes] will be described. As described, the MTU is a permissible magnitude of the data size that is set for each network and that is transmittable in one packet of transmission. Therefore, when the communication terminal apparatus 120 establishes a connection to another network and thereby, executes the UDLR, a different MTU may be set (the MTU may also be MTU=1,500 [bytes]). Therefore, each time a connection is established, the packet size is adjusted to be the largest size that matches the MTU set.

Figure 5:
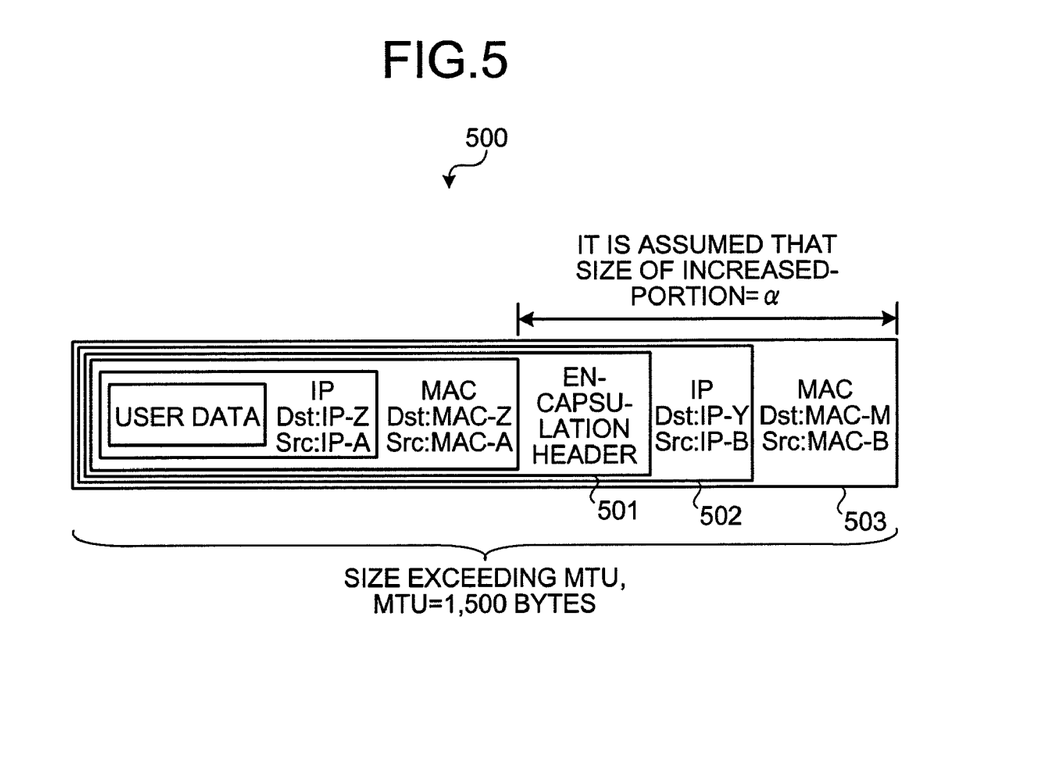
FIG. 5 is a diagram of a configuration of a frame of transmission data 500.

The transmission data 400 is subject to encapsulation by the receiving unit 132 to use the UDLR and becomes transmission data 500. FIG. 5 is a diagram of the configuration of the frame of the transmission data 500. As depicted in FIG. 5, the transmission data 500 includes the transmission data 400 to which an encapsulation header packet 501, an encapsulation IP packet 502, and an encapsulation MAC packet 503 are appended as packets concerning the encapsulation.

The encapsulation header packet 501 is a packet indicating that the transmission data 400 is encapsulated. More specifically, for example, the encapsulation is executed using a GRE (Generic Routing Encapsulation) protocol, etc.

The encapsulation IP packet 502 is configured by IP addresses of the communication processing unit 133 that is the transmission source and the receiving unit 121 that is the transmission destination used when the encapsulation is executed. The encapsulation MAC packet 503 stores therein the MAC address (Src: MAC-B) of the communication processing unit 133 that is the transmission source and the MAC address (Dst: MAC-M) of a receiving interface of R3 that is the nearest transmission destination used when the encapsulation is executed.

The packet size of the appended packet portions 501 to 503 of the transmission data 500 is an increased-portion size that is the increased-portion size=α with respect to the transmission data 400. As described, the transmission data 400 is adjusted to have a packet size that is within the MTU (in this case, within 1,500 [bytes]). However, the transmission data 400 is appended with the increased-portion size=α and becomes the transmission data 500. As a result, the transmission data 500 has a packet size larger than the MTU. This increased-portion of the packet size generated by the encapsulation is one factor that causes the packet size to exceed the MTU. The value of the increased-portion=α is stored in a memory, etc., such that the value may be used in error processing described hereinafter.

The transmission data 500 is transmitted from the I/F unit 137 of the communication processing unit 133 to the network 220. The relay apparatus R3 detects that the transmission data 500 exceeds the MTU. Transmission data 600 including the error message "Packet Too Big" is returned from the relay apparatus R3 to the I/F unit 137 of the communication processing unit 133.

Figure 6:
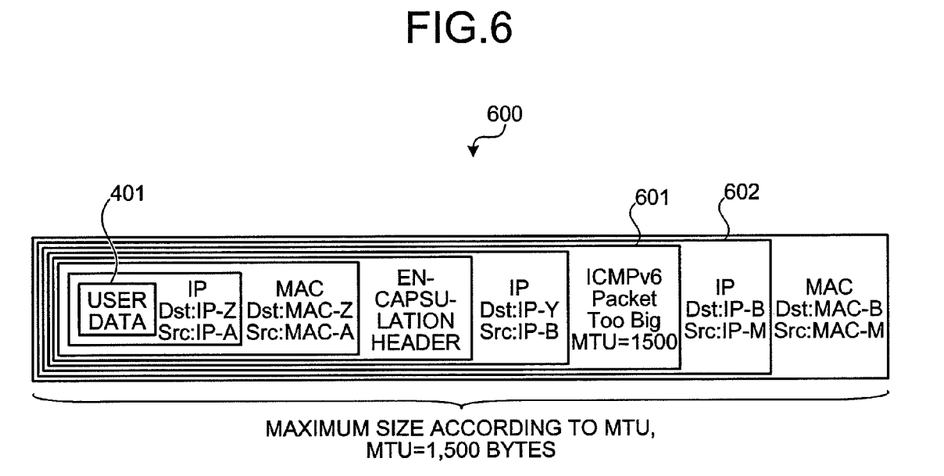
FIG. 6 is a diagram of a configuration of a frame of transmission data 600.

FIG. 6 is a diagram of a configuration of the frame of the transmission data 600. As depicted in FIG. 6, the transmission data 600 is configured by the transmission data 500 appended with an error message packet 601 and a transmission destination IP address packet 602 to return the transmission data 500 to the communication processing unit 133 of the communication terminal apparatus 130. The packet size of the entire transmission data 600 is adjusted according to the MTU such that the transmission data 600 may be transmitted by the relay apparatus R3 to the network 220. More specifically, the adjustment is a process of reducing the packet size to a size equal to or smaller than the MTU (1,500 [bytes]) by deleting a portion of the user data packet 401.

When the communication processing unit 133 receives the transmission data 600 that is returned from the relay apparatus R3 by the I/F unit 137 (see FIG. 2-1), the detecting unit 134 (see FIG. 2-1) detects that the transmission data 600 is a packet encapsulated using the GRE protocol, etc. and is data that includes the error message packet 601. When the detecting unit 134 detects the transmission data 600 as data that includes an error message, the detected data is set by the setting unit 135 as new transmission data.

The communication processing unit 133 extracts the MTU included in the error message packet 601 and sets the extracted MTU to be the MTU of the network 220. The communication processing unit 133 progresses to a process to transmit the new transmission data. The error processing unit 136 extracts the increased-portion size=α added when the encapsulation is executed, from the transmission data 500. The error processing unit 136 calculates a value by subtracting the increased-portion size=α from the value of the MTU extracted from the error message packet 601 as the MTU(α) to be referred to when the receiving unit 132 outputs transmission data. New transmission data 700 is created from the transmission data 600 based on the MTU(α) calculated.

Figure 7:
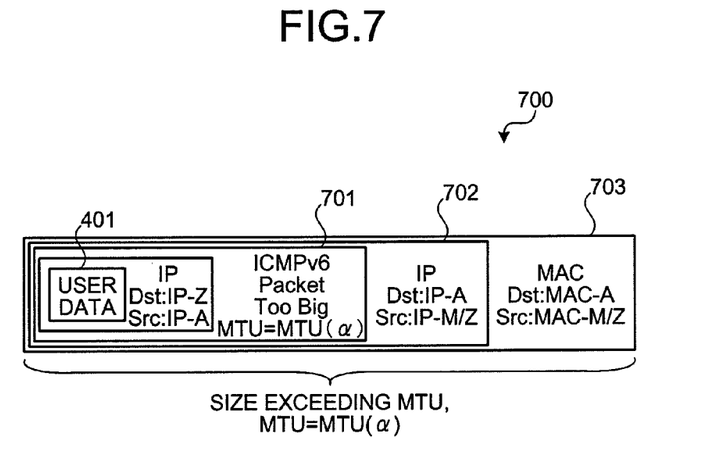
FIG. 7 is a diagram of a configuration of a frame of transmission data 700.

FIG. 7 is a diagram of a configuration of the frame of the transmission data 700. As depicted in FIG. 7, an error message packet 701 formed by rewriting the MTU (1,500 [bytes]) of the error message packet 601 of the transmission data 600 to MTU MTU(α) is created and the packet size of the entire transmission data 700 is adjusted such that the MTU becomes MTU MTU(α). In this case, the packet size is also adjusted by properly deleting the user data packet 401.

When the transmission data 700 is created, to distribute the error message packet 701 to the receiving unit 132 of the communication terminal apparatus 130, the addresses of the transmission destinations of an IP address packet 702 and an MAC address packet 703 are set to be the addresses corresponding to the receiving unit 132 of the communication terminal apparatus 130 (IP address: IP-A, MAC address: MAC-A).

The addresses of the transmission sources of the IP address packet 702 and the MAC address packet 703 of the transmission data 700 are set to be the addresses of the relay apparatus R3 (IP address: IP-M, MAC address: MAC-M) that has returned the transmission data 600 including the error message "Packet Too Big" to the I/F unit 137 of the communication processing unit 133 (see FIG. 6), or the addresses of the router Z (IP address: IP-Z, MAC address: MAC-Z).

Encapsulation is again executed for the transmission data 700 created as described above to transmit the data 700 from the network 220 to the tunneling apparatus 120. The transmission data encapsulated by the error processing unit 136 has the configuration of transmission data 800 described hereinafter. However, although the encapsulation executed again may be executed by the error processing unit 136 as one method, this encapsulation may also be executed utilizing a processing method of encapsulating an ordinary packet.

Figure 8:
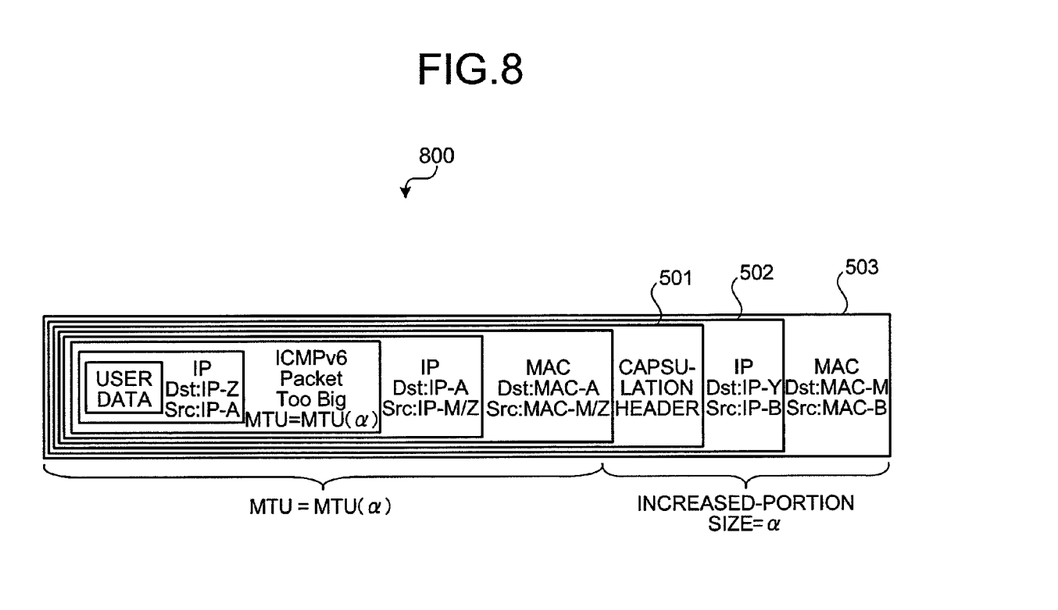
FIG. 8 is a diagram of a configuration of a frame of transmission data 800.

FIG. 8 is a diagram of a configuration of the frame of the transmission data 800. As depicted in FIG. 8, the transmission data 800 is configured by the transmission data 500 added again with the packets (the encapsulation header packet 501, the encapsulation IP packet 502, and the encapsulation MAC packet 503) concerning the encapsulation that are added to the transmission data 500 depicted in FIG. 5. The increased-portion size of each of the packets is the increased-portion size=α and the packet size of the entire transmission data 700 is MTU=MTU(α). Therefore, as a result, the packet size of the entire transmission data 800 is a size that is within the MTU that is MTU=1,500 [bytes].

The transmission data 800 processed by the error processing unit 136 is transmitted from the I/F unit 137 to the network 220. The transmission data 800 is received by the receiving unit 121 of the tunneling apparatus 120. The receiving unit 121 decapsulates the encapsulation of the transmission data 800 received, and extracts transmission data 900.

Figure 9:
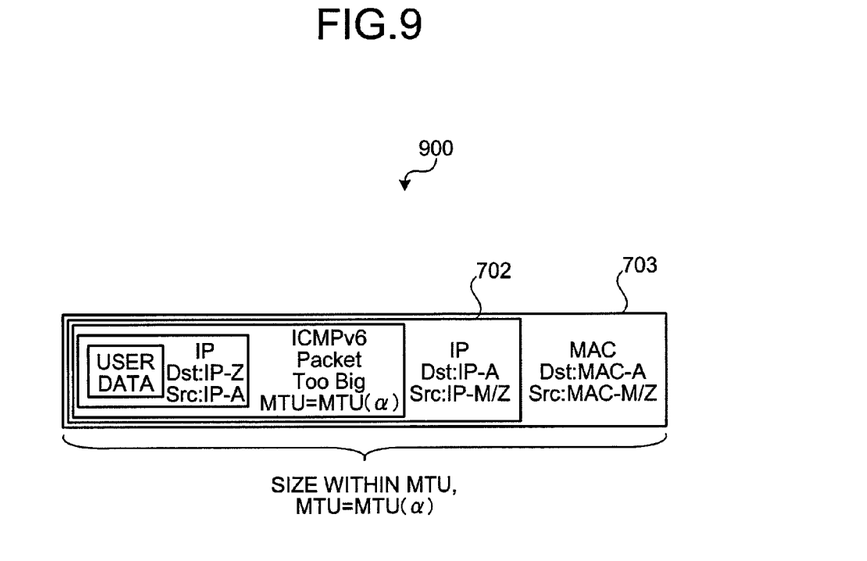
FIG. 9 is a diagram of a configuration of a frame of transmission data 900.

FIG. 9 is a diagram of a configuration of the frame of the transmission data 900. As depicted in FIG. 9, the transmission data 900 is configured by removing the packets (the encapsulation header packet 501, the encapsulation IP packet 502, and the encapsulation MAC packet 503) concerning the encapsulation, from the transmission data 800. That is, the transmission data 900 has the same configuration as that of the transmission data 700.

The receiving unit 121 extracts the addresses (Dst: IP=A, MAC-A) of the transmission destination that are set in the IP address packet 702 and the MAC address packet 703, from the transmission data 900. The receiving unit 121 executes a process to distribute the transmission data 900 to the receiving unit 132 of the communication terminal apparatus 130 that the addresses represent. More specifically, the receiving unit 121 outputs the transmission data 900 to the distributing unit 122. The distributing unit 122, using the network 210, distributes the transmission data 900 to the receiving unit 132 of the communication terminal apparatuses 130 having the destination addresses that are set in the packet.

The receiving unit 132 of the communication terminal apparatus 130 uniquely receives distributed data (the transmission data 900) distributed from the network 210. As a result, the receiving unit 132 receives the error message "Packet Too Big" transmitted from the relay apparatus R3, changes the value of the MTU for the network 210 to the MTU(α), and makes settings to transmit to the router Z, the transmission data of a packet size corresponding to the resulting MTU.

As described, according to the communication terminal apparatus, the distribution apparatus, the error notification method, and the error notification program, a relay apparatus may assuredly give notification of an error via an error message regardless of the network configuration. When the receiving unit 132 that is notified of an error transmits again the transmission data to the distributing unit 122, the receiving unit 132 changes the content of the transmission data such that the size of the transmission data becomes equal to or smaller than the MTU. More specifically, the receiving unit 132 executes an adjustment such that the size of each frame becomes equal to or smaller than the MTU by deleting or dividing the capacity of the user data packet 401 of the transmission data 400 depicted in FIG. 4.

When transmission data of a packet size larger than the MTU is desired to be transmitted, the MTU of the error message received by the receiving unit 132 of the communication terminal apparatus 130 may be set in the OS/application unit 131. In such an example, the OS/application unit 131 divides the transmission data into capacities that each are the MTU, sequentially outputs the divided transmission data to be transmitted to the tunneling apparatus 120.

Taking into account the increased-portion of the packet to be added due to the encapsulation, the MTU is the packet size that is reduced in advance by the amount of the increased-portion. That is, exceeding the MTU due to the encapsulation may be prevented even using a response that uses the UDLR. Therefore, the MTU is set to be the largest communicable packet size and the transmission data may efficiently be transmitted.

The value of the MTU of a network varies for each connection as in the embodiment even when the same communication terminal apparatus transmits data. Therefore, even when the MTU is set once by the above error notification process, the same process may be executed for each connection.

Further, the MTU set once using the error message may be stored and used as the initial value of the packet size of transmission data for the next session of transmission. When the MTU in the previous session of transmission is used as the initial value as described, depending on the network connected, the MTU may become smaller each time the error notification process is repeated and as a result, the MTU may converge to the smallest MTU. Therefore, a setting of using the previous MTU as the initial value and a setting of using an MTU of a relatively large value as the initial value may be used in parallel.

The error notification method explained in the present embodiment may be implemented by a computer, such as a personal computer and a workstation, executing a program that is prepared in advance. The program is recorded on a computer-readable recording medium such as a hard disk, a flexible disk, a CD-ROM, an MO, and a DVD, and is executed by being read out from the recording medium by a computer. The program may be distributed through a network such as the Internet.

INDUSTRIAL APPLICABILITY

As described, the communication terminal apparatus, the distribution apparatus, the error notification method, and the error notification program according to the present invention are useful for transmission and reception of data using unidirectional communication such as broadcasting and in particular, are suitable for error notification between networks configured using the UDLR.

The invention claimed is:

1. A communication terminal apparatus that receives using a unidirectional communication network and that transmits using a bidirectional communication network, comprising:
   a receiving unit that receives distribution data distributed through the unidirectional communication network;
   an accepting unit that accepts transmission data to be transmitted to a distribution source of the distribution data received by the receiving unit; and
   a communication processing unit that transmits the transmission data accepted by the accepting unit to the bidirectional communication network, wherein the communication processing unit comprises:
- a detecting unit that detects an error message concerning the transmission data from the bidirectional communication network;
- a setting unit that sets the transmission data that includes the error message detected by the detecting unit, to be new transmission data;
- an error processing unit that subjects the new transmission data set by the setting unit to a process of resolving an error corresponding to the error message; and
- a transmitting unit that transmits the new transmission data whose error has been resolved by the error processing unit to the bidirectional communication network to use the new transmission data as the distribution data from the distribution source;
- wherein the receiving unit extracts the error message from the distribution data, when the distribution data received by the receiving unit is the transmission data that has been error-processed by the error processing unit,
- wherein the accepting unit divides the accepted transmission data into the permissible amount for the bidirectional communication network, when the error message extracted from the distribution data by the receiving unit indicates that the capacity of the transmission data exceeds the permissible amount of the bidirectional communication network, and
- the transmitting unit transmits the new transmission data that has been divided by the accepting unit.

2. The communication terminal apparatus according to claim 1, wherein
the error processing unit, when the detecting unit detects an error message indicating that a capacity of the transmission data exceeds than a permissible amount for the bidirectional communication network to which the transmission data is transmitted, executes a process of reducing the capacity of the transmission data into which the error message is incorporated by an incorporating unit, to an amount that is equal to or less than the permissible amount.

3. A distribution apparatus comprising:
a distributing unit that distributes distribution data using a unidirectional communication network; and
a receiving unit that receives transmission data from a terminal that is a distribution destination of the distribution data, using a bidirectional communication network,
a detecting unit that detects an error message concerning the transmission data from the bidirectional communication network;
a setting unit that sets the transmission data that includes the error message detected by the detecting unit, to be new transmission data;
an error processing unit that subjects the new transmission data set by the setting unit to a process of resolving an error corresponding to the error message;
an accepting unit that accepts transmission data to be transmitted to a distribution source of the distribution data received by the receiving unit;
a transmitting unit that transmits the new transmission data whose error has been resolved by the error processing unit to the bidirectional communication network to use the new transmission data as the distribution data from the distribution source,
wherein the distributing unit distributes the transmission data as the distribution data to a terminal that is a transmission source of transmission data that includes an error message received by the receiving unit, when the receiving unit receives transmission data that includes an error message from a terminal,
wherein the receiving unit extracts the error message from the distribution data, when the distribution data received by the receiving unit is the transmission data that has been error-processed by an error processing unit,
wherein an accepting unit divides an accepted transmission data into a permissible amount for the bidirectional communication network, when the error message extracted from the distribution data by the receiving unit indicates that a capacity of the transmission data exceeds the permissible amount of the bidirectional communication network, and
a transmitting unit transmits the new transmission data that has been divided by the accepting unit.

4. The distribution apparatus according to claim 3, wherein the distributing unit distributes identification information of the terminal that is the transmission source of the transmission data including the error message received by the receiving unit, by attaching the identification information to the distribution data.

5. An error notification method of a communication terminal apparatus that receives by a unidirectional communication network and transmits by a bidirectional communication network, the error notification method comprising:
a receiving step of receiving, distribution data distributed through the unidirectional communication network;
an accepting step of accepting transmission data to be transmitted to a distribution source of the distribution data received at the receiving step;
a first transmitting step of transmitting the transmission data accepted at the accepting step to the bidirectional communication network;
a setting step of setting, when an error message is detected with respect to the transmission data from the bidirectional communication network, the transmission data including the detected error message to be new transmission data;
an error processing step of subjecting the new transmission data set at the setting step to a process of resolving an error corresponding to the error message; and
a second transmitting step of transmitting the new transmission data whose error has been resolved at the error processing step, to the bidirectional communication network to use the new transmission data as the distribution data from the distribution source,
wherein, in the receiving step the error message is extracted from the distribution data, when the distribution data received is the transmission data that has been error-processed by the error processing step,
wherein in the accepting step an accepted transmission data is divided into a permissible amount for the bidirectional communication network, when the error message extracted from the distribution data in the receiving step indicates that a capacity of the transmission data exceeds the permissible amount of the bidirectional communication network, and
wherein in the second transmitting step the new transmission data that has been divided by the accepting unit is transmitted.

6. An error notification method comprising:
a receiving step of receiving via a bidirectional communication network and by a transmitting unit of a distribution apparatus, transmission data from a terminal that is a distribution destination of distribution data; and
distributing via a unidirectional communication network, by a distribution unit of the distribution apparatus and as distribution data, the transmission data to the terminal that is a transmission source of the transmission data received at the receiving step and includes an error message, a detecting step that detects an error message concerning the transmission data from the bidirectional communication network;

a setting step that sets the transmission data that includes the error message detected by the detecting step, to be new transmission data;

an error processing step of subjecting the new transmission data set at the setting step to a process of resolving an error corresponding to the error message; and an accepting step of accepting transmission data to be transmitted to a distribution source of the distribution data received at the receiving step;

a second transmitting step of transmitting the new transmission data whose error has been resolved at the error processing step, to the bidirectional communication network to use the new transmission data as the distribution data from the distribution source, wherein, in the receiving step the error message is extracted from the distribution data, when the distribution data received is the transmission data that has been error-processed by the error processing step, wherein in the accepting step an accepted transmission data is divided into a permissible amount for the bidirectional communication network, when the error message extracted from the distribution data in the receiving step indicates that a capacity of the transmission data exceeds the permissible amount of the bidirectional communication network, and wherein in the second transmitting step the new transmission data that has been divided by the accepting unit is transmitted.

7. A non-transitory computer readable medium encoded with a program causing a computer to execute the steps comprising:

a receiving step of receiving, distribution data distributed through the unidirectional communication network;

an accepting step of accepting transmission data to be transmitted to a distribution source of the distribution data received at the receiving step;

a first transmitting step of transmitting the transmission data accepted at the accepting step to the bidirectional communication network;

a setting step of setting, when an error message is detected with respect to the transmission data from the bidirectional communication network, the transmission data including the detected error message to be new transmission data;

an error processing step of subjecting the new transmission data set at the setting step to a process of resolving an error corresponding to the error message; and a second transmitting step of transmitting the new transmission data whose error has been resolved at the error processing step, to the bidirectional communication network to use the new transmission data as the distribution data from the distribution source, wherein, in the receiving step the error message is extracted from the distribution data, when the distribution data received is the transmission data that has been error-processed by the error processing step, wherein in the accepting step an accepted transmission data is divided into a permissible amount for the bidirectional communication network, when the error message extracted from the distribution data in the receiving step indicates that a capacity of the transmission data exceeds the permissible amount of the bidirectional communication network, and wherein in the second transmitting step the new transmission data that has been divided by the accepting unit is transmitted.

8. A non-transitory computer readable medium encoded with a program causing a computer to execute the steps comprising:

receiving via a bidirectional communication network and by a transmitting unit of a distribution apparatus, transmission data from a terminal that is a distribution destination of distribution data; and distributing via a unidirectional communication network, by a distribution unit of the distribution apparatus and as distribution data, the transmission data to the terminal that is a transmission source of the transmission data received at the receiving step and includes an error message, a detecting step that detects an error message concerning the transmission data from the bidirectional communication network;

a setting step that sets the transmission data that includes the error message detected by the detecting step, to be new transmission data, an error processing step of subjecting the new transmission data set at the setting step to a process of resolving an error corresponding to the error message; and an accepting step of accepting transmission data to be transmitted to a distribution source of the distribution data received at the receiving step;

a second transmitting step of transmitting the new transmission data whose error has been resolved at the error processing step, to the bidirectional communication network to use the new transmission data as the distribution data from the distribution source, wherein, in the receiving step the error message is extracted from the distribution data, when the distribution data received is the transmission data that has been error-processed by the error processing step, wherein in the accepting step an accepted transmission data is divided into a permissible amount for the bidirectional communication network, when the error message extracted from the distribution data in the receiving step indicates that a capacity of the transmission data exceeds the permissible amount of the bidirectional communication network, and wherein in the second transmitting step the new transmission data that has been divided by the accepting unit is transmitted.

* * * * *